United States Patent
Wootten et al.

(10) Patent No.: US 7,506,078 B2
(45) Date of Patent: Mar. 17, 2009

(54) INTEGRATED CIRCUIT CAPABLE OF ASSIGNING A UNIQUE IDENTITY TO ATA/ATAPI DEVICES

(75) Inventors: Jonathan Wootten, Queen Creek, AZ (US); Roger C. Jeppsen, Chandler, AZ (US); Nathan E. Marushak, Gilbert, AZ (US); Brian Skerry, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 10/977,223

(22) Filed: Oct. 29, 2004

(65) Prior Publication Data

US 2006/0095625 A1    May 4, 2006

(51) Int. Cl.
*G06F 3/00* (2006.01)
*G06F 13/12* (2006.01)

(52) U.S. Cl. .................. 710/15; 710/5; 710/16; 710/17; 710/18; 710/65

(58) Field of Classification Search .......... 710/71, 710/72, 74
See application file for complete search history.

(56) References Cited

U.S. PATENT DOCUMENTS

| | | | |
|---|---|---|---|
| 7,035,952 B2 * | 4/2006 | Elliott et al. | 710/300 |
| 2005/0108452 A1 * | 5/2005 | Loffink | 710/74 |
| 2005/0149656 A1 * | 7/2005 | Seto | 710/105 |
| 2005/0228924 A1 * | 10/2005 | Marushak et al. | 710/300 |
| 2006/0004935 A1 * | 1/2006 | Seto et al. | 710/62 |
| 2006/0064568 A1 * | 3/2006 | Seto et al. | 711/209 |

OTHER PUBLICATIONS

Rob Elliott, SAS Device Identification VPD page requirements, Oct. 22, 2002, T10 Technical Committee, pp. 1-3.*
Working Draft American National Standard—Serial Attached SCSI—1.1 (SAS-1.1), pp. 53-56 and 81-90.*

* cited by examiner

*Primary Examiner*—Alan Chen
(74) *Attorney, Agent, or Firm*—Christopher K. Gagne

(57) ABSTRACT

A method according to one embodiment may include discovering at least one ATA/ATAPI target device. The method of this embodiment may also include discovering a SAS address for the at least one ATA/ATAPI target device. The method of this embodiment may also include returning the SAS address for the at least one ATA/ATAPI target device in response to a device inquiry command. Of course, many alternatives, variations, and modifications are possible without departing from this embodiment.

24 Claims, 4 Drawing Sheets

INTEGRATED CIRCUIT CAPABLE OF ASSIGNING A UNIQUE IDENTITY TO ATA/ATAPI DEVICES

FIELD

The present disclosure relates to an integrated circuit capable of assigning a unique identity to ATA/ATAPI devices.

BACKGROUND

In one conventional data storage arrangement, a computer node includes a host bus adapter (HBA). The HBA communicates with data storage devices, either directly or through an expander device. Data storage devices in the data storage system may include devices that communicate using different communication protocols. In at least one conventional data storage arrangement, one type of data storage device may generate a unique identity, while other devices may not. For those devices that may not generate a unique identity, the HBA in the conventional data storage arrangement is incompatible of assigning a unique device identity with one or more target storage devices, and thus, certain target storage devices may not be able to be used in a data storage arrangement that requires a device to be uniquely identified.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
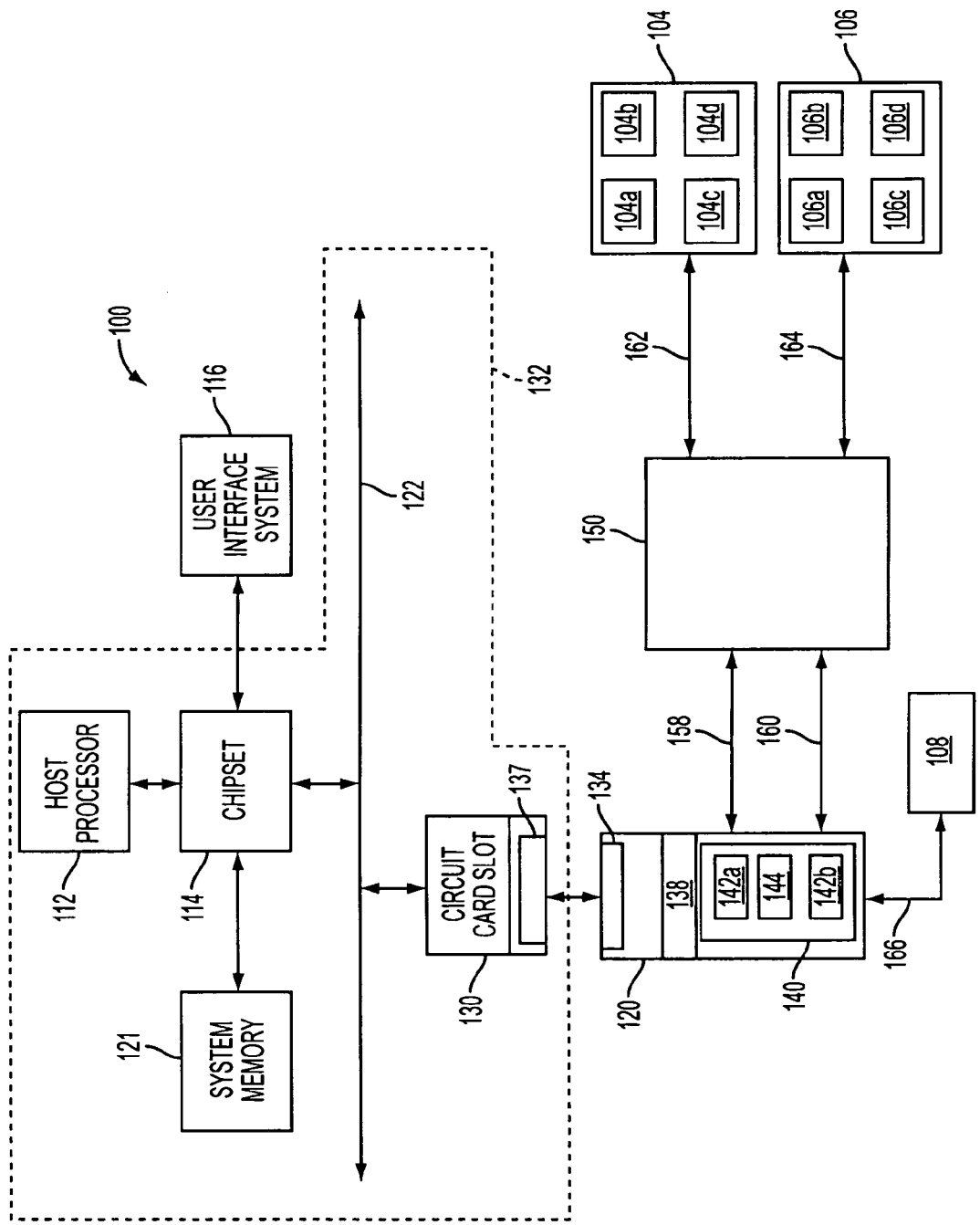
FIG. 1 is a diagram illustrating a system embodiment.

FIG. 1 illustrates a system embodiment 100 of the claimed subject matter. The system 100 may generally include a host processor 112, a bus 122, a user interface system 116, a chipset 114, system memory 121, a circuit card slot 130, and a circuit card 120 that is capable of communicating with the mass storage 104. The host processor 112 may include any variety of processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may also comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include a variety of devices for human users to input commands and/or data and to monitor the system such as a keyboard, pointing device, and video display. The chipset 114 may include host bridge/hub system (not shown) that couples the processor 112, system memory 121, and user interface system 116 to each other and to the bus 122. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114 and circuit card slot 130 may be integrated onto one motherboard. In this embodiment, the processor 112, system memory 121, chipset 114 and circuit card slot 130 may be generically referred to as "host system" 132. As will be detailed herein, host system 132 may be capable of exchanging commands and data with mass storage 104 and/or 106 and/or 108 via circuit card 120.

The circuit card 120 may be constructed to permit it to be inserted into slot 130. When the circuit card 120 is properly inserted into slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114. Alternatively, without departing from this embodiment, the operative circuitry of the circuit card 120 may be included in other structures, systems, and/or devices. These other structures, systems, and/or devices may be, for example, in the motherboard 132, coupled to the bus 122. Processor 112, system memory 121, chipset 114, bus 122, and circuit card slot 130 may be comprised in a single circuit board. Alternatively, and without departing from this embodiment, circuit card 120 may comprise one or more chipsets comprised in, for example, a system motherboard.

The circuit card 120 may communicate with mass storage 104 and/or mass storage 106 and/or mass storage 108 using a plurality of communication protocols. Circuit card 120 may comprise a host bus adaptor (HBA) which may be capable of exchanging commands and data between processor 112 and mass storage 104 and/or mass storage 106 and/or mass storage 108. The circuit card 120 may comprise an integrated circuit 140 capable of exchanging commands and/or data between the host system 132 and the mass storage 104 and/or mass storage 106, and/or mass storage 108. As used herein, an "integrated circuit" means a semiconductor device and/or microelectronic device, such as, for example, a semiconductor integrated circuit chip.

The circuit card 120 may also comprise memory 138. Memory 138 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 154 may comprise other and/or later-developed types of computer-readable memory. Machine-readable firmware program instructions may be stored in memory 138. As described below, these instructions may be accessed and executed by integrated circuit 140. When executed by integrated circuit 140, these instructions may result in integrated circuit 140 performing the operations described herein as being performed by integrated circuit 140. Additionally, and as will be described in more detailed below, memory 138 and/or other memory (not shown) may be capable of storing data which may be associated with the operation of integrated circuit 140.

If a Fibre Channel (FC) protocol is used by circuit card 120 to exchange data and/or commands with mass storage 104 and/or mass storage 106 and/or mass storage 108, it may comply or be compatible with the interface/protocol described in "ANSI Standard Fibre Channel Physical and Signaling Interface-3 X3.303:1998 Specification." Alternatively or additionally, if a Serial ATA (SATA) protocol is used by controller circuit card 120 to exchange data and/or commands with mass storage 104 and/or mass storage 106 and/or mass storage 108, it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group earlier and/or later published versions of the SATA standard. Further additionally or alternatively, if a parallel ATA (PATA) is used by controller circuit card 120 to exchange data and/or commands with mass storage 104 and/or mass storage 106 and/or mass storage 108, it may comply or be compatible with the protocol described in "Information Technology—AT Attachment With Packet Interface—7 Volume 2—Parallel Transport Protocols and Physical Interconnect (ATA/ATAPI-7 V2)" Working Draft American National Standard of International Committee For Information Technology Standards (INCITS) T13 Technical Committee, Project 1532D, Volume 2, Revision 4b, published Apr. 21, 2004, by American National Standards Institute and/or earlier and/or later published versions. Further alternatively or additionally, if a Serial Attached Small Computer System Interface (SAS) protocol is used by controller circuit card 120 to exchange data and/or commands with mass storage 104 and/or mass storage 106 and/or mass storage 108, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard. The SAS communication protocol may include one or more communication transport protocols, for example, Serial Advanced Attachment (ATA) Tunneled Protocol (STP) and Serial Small Computer System Interface (SCSI) Protocol (SSP).

Integrated circuit 140 may comprise a plurality of SAS initiator engine circuitry, for example, 142a and 142b (hereinafter "SAS initiator" or "initiator engines"), each of which may be capable of communicating using SAS and/or SATA communication protocols. As used in any embodiment herein, "circuitry" may comprise, for example, singly or in any combination, hardwired circuitry, programmable circuitry, state machine circuitry, and/or firmware that stores instructions executed by programmable circuitry. Also, in any embodiment herein, circuitry may be embodied as, and/or form part of, one or more integrated circuits. While the present embodiment depicts two initiator engines 142a and 142b, it should be understood that any number of initiator engines, including a single initiator engine, may be employed in integrated circuit 140 without departing from this embodiment.

SAS initiator engine circuitry 142a and/or 142b may be capable of generating one or more SCSI commands, and exchanging SCSI commands with host system 132 and/or expander 150 and/or SAS devices comprised in mass storage 104. "SCSI commands", as used in any embodiment herein, may comprise one or more commands as described in "Information Technology—SCSI Primary Commands—3 (SPC-3)" published on May 16, 2003 by the T10 Technical Committee of Accredited Standards Committee and/or earlier and/or later published versions, one or more commands as described in "Information Technology—Multimedia Commands—5 (MMC-5)" Working Draft American National Standard of International Committee For Information Technology Standards (INCITS) T10 Technical Committee, Project T10/1675-D, Revision 1, published Oct. 11, 2004, by American National Standards Institute and/or earlier and/or later published versions, and/or one or more commands as described in "Information Technology—SCSI Block Commands—2 (SBC-2)" Working Draft American National Standard of International Committee For Information Technology Standards (INCITS) T10 Technical Committee, Project T10/1417-D, Revision 14, published May 11, 2004, by American National Standards Institute and/or earlier and/or later published versions. In at least one embodiment described herein, SAS initiator engine 142a and/or 142b may be capable of utilizing SSP transport protocol to communicate one or more SCSI commands. Additionally, SAS initiators 142a and/or 142b may be capable of communicating using serial management protocol (SMP) commands, which may be defined by the aforementioned SAS standard.

Mass storage 104 may comprise one or more Serial SCSI devices 104a, 104b, 104c and/or 104d that comply or are compatible with SSP communication protocols (hereinafter "SAS devices"). Mass storage 106 may comprise one or more target ATA/ATAPI storage devices 106a, 106b, 106c and/or 106d. Likewise, mass storage 108 may comprise one or more target ATA/ATAPI storage devices. ATA/ATAPI devices comprised in mass storage 106 and/or 108 may also be capable of generating and/or receiving one or more ATA/ATAPI commands. "ATA/ATAPI commands", as used in any embodiment herein, may comply or be compatible with one or more commands described in "Information Technology—AT Attachment With Packet Interface—7 Volume 1—Register Delivered Command Set, Logical Register Set (ATA/ATAPI-7 V1)" Working Draft American National Standard of International Committee For Information Technology Standards (INCITS) T13 Technical Committee, Project 1532D, Volume 1, Revision 4b, published Apr. 21, 2004, by American National Standards Institute and/or earlier and/or later published versions.

ATA/ATAPI commands may be transmitted to one or more ATA/ATAPI devices, or responses transmitted from one or more ATA/ATAPI devices, using the aforementioned SATA and/or PATA communications protocol. "ATA/ATAPI storage devices" or "ATA/ATAPI devices", as used herein, may include Serial ATA (SATA) capable of communicating using the aforementioned SATA communications protocol and/or parallel ATA (PATA) storage devices capable of communicating using the aforementioned PATA communications protocol, and/or any type of device that complies or is compatible with ATA/ATAPI commands. In this embodiment, ATA/ATAPI devices may include, for example, hard disk devices, CD-ROM devices, DVD-ROM/RAM devices and/or any type of devices that may comply or are compatible with the ATA/ATAPI commands. ATA/ATAPI devices comprised in mass storage 106 and/or 108 may comprise, individually or collectively, a clustered network storage environment. The network storage environment may comprise a SAS network.

Mass storage 104 and mass storage 106 may each comprise, individually or collectively, a clustered network storage environment. The network storage environment 104 and/or 106 may comprise a SAS protocol domain. The network storage environment 106 may comprise a SATA protocol domain. Both SAS and ATA/ATAPI devices may be connected to a SAS network. ATA/ATAPI devices connected to a SAS network may communicate using the aforementioned STP protocols and/or SATA communication protocols. Mass storage 108, in this embodiment, may comprise an ATA/ATAPI device directly attached to circuit card 120 (hereinafter referred to as "direct attached ATA/ATAPI device").

The present embodiment may also comprise an expander device 150 coupled to initiator engines 142a and 142b, via respective communications links 158 and 160. The expander device 150 may also be coupled to mass storage 104 and/or 106, via communications links 162 and 164, respectively. As used in any embodiment herein, an "expander device" may comprise one or more integrated circuits which may comprise circuitry to transmit and/or receive at least one signal. Expander device 150 may be capable of permitting multiple devices to be coupled to one or more initiator engines. Expander device 150 may also provide device clustering which may provide sharing of multiple device resources between multiple initiator engines. The expander device 150 may also be capable of expanding the number of target devices which may be coupled to circuit card 120, which may form a clustered network storage environment.

Although not shown in the drawings, expander device 150 may include one or more integrated circuits which may collectively or individually be capable of similar operations as described herein with respect to integrated circuit 140 and/or SAS initiator engines 142a and/or 142b. Thus, for example, expander device 150 may be capable of communicating with one or more SAS devices comprised in mass storage 104 using SAS communication protocols and/or one or more ATA/ATAPI devices comprised in mass storage 106 using SATA communication protocols. Expander device 150 may also be capable of exchanging SMP commands with initiator engine 142a and/or 142b to permit, for example, initiator engine 142a and/or 142b to discover information related to expander 150. Expander information may include, for example, the number and type of devices coupled thereto.

In this embodiment, host system 132 may be capable of communicating with circuit card 120 using SCSI commands (over, for example, PCI bus 122). For example, host system 132 may generate SCSI Inquiry commands to determine, via circuit card 120, the number and type of devices coupled to the circuit card 120 (either directly or via expander 150). An exemplary SCSI Inquiry command may comprise a Vital Product Data (VPD) Page 0x83 Inquiry command. In response thereto, at least in part, SAS initiator engine 142a and/or 142b may exchange SCSI commands with one or more SAS devices comprised in mass storage 104 (via expander 150) using the aforementioned SAS communication protocols to discover, for example, a unique device identity for each SAS device present. The SAS standard provides a unique device identifier for each SAS device connected thereto (either directly or connected to expander 150). In this embodiment, the unique identifier may comprise a sequence of data that complies or is compatible with a unique device identifier provided in the Institute for Electronic and Electrical Engineers (IEEE) standard, as may be defined in the IEEE Standard 1212-1991, IEEE Standard Control and Status Register (CSR) Architecture and/or the aforementioned SAS standard ("IEEE ID"). One exemplary IEEE ID may comprise a 64-bit signal sequence that uniquely identifies a SAS device. The IEEE ID may be stored in memory 138. In response to a VPD query from host system 132, integrated circuit 140 may be capable of returning a SCSI response that includes an IEEE ID for one or more SAS devices coupled to circuit card 120, either directly or via expander 150.

Integrated circuit 140 may also comprise protocol translator circuitry 144. Protocol translator circuitry 144 may be capable of translating between first commands of a first type and second commands of a second type. For example, protocol translator circuitry 144 may be capable of translating between SCSI commands and ATA/ATAPI commands. In this embodiment, as described above, host system 132 may be capable of exchanging SCSI commands with circuit card 120. In response thereto, protocol translation circuitry 144 may be capable of translating SCSI commands into corresponding ATA/ATAPI commands. SCSI to ATA/ATAPI translation may permit, for example, host system 132 to communicate with one or more ATA/ATAPI devices coupled to circuit card (either directly or via expander 150) using SCSI commands. Of course, protocol translation circuitry 144 may also be capable of translating ATA/ATAPI responses (from, for example one or more ATA/ATAPI devices comprised in mass storage 106 and/or 108) into corresponding SCSI responses and returning the SCSI responses to host system 132.

Conventional ATA/ATAPI devices do not support the IEEE ID. As stated, host system 132 may generate SCSI query commands to determine, via circuit card 120, the number and type of devices coupled to the circuit card 120 (either directly or via expander 150). In response thereto, SAS initiator engine 142a and/or 142b may exchange ATA/ATAPI commands with one or more ATA/ATAPI devices comprised in mass storage 106 (via expander 150) and/or direct attached ATA/ATAPI devices 108 using the aforementioned SATA and/or PATA communication protocols to discover, for example, a device identity for each ATA/ATAPI device present. Since, in this embodiment, the ATA/ATAPI devices comprised in mass storage 106 and/or 108 may not return an IEEE ID, either SAS initiator engine 142a and/or 142b or expander device 150 may be capable of assigning and/or discovering a "SAS address" for each ATA/ATAPI device present. The SAS address may comprise a sequence of data that may be based on for example, the serial number and/or model number of the ATA/ATAPI device. Alternatively or additionally, the SAS address may also be based on an initiator PCI-Express serial number. Further alternatively or additionally, the SAS address may be based on a random number which may be generated by SAS initiator engine 142a and/or 142b or expander device 150. The SAS address may be unique, and in this embodiment, the SAS address may comply or is compatible with the IEEE address.

Also, in this embodiment, the SAS address may comprise an "attached SAS address", which may be assigned by expander 150 for each ATA/ATAPI device coupled to expander 150 and discovered by initiator engine 142a and/or 142b. Also, in this embodiment, the SAS address may comprise a "local SAS address", which may be assigned by SAS initiator engine 142a and/or 142b for each ATA/ATAPI device coupled directly to circuit card 120. The SAS address may be stored in memory 138. In response to a VPD Page 0x83 Inquiry from host system 132, integrated circuit 140 may be capable of discovering a SAS address (for example, an attached SAS address and/or a local SAS address) for one or more ATA/ATAPI devices coupled to circuit card 120, either directly or via expander 150, and returning a SCSI response that includes the SAS address.

Figure 2:
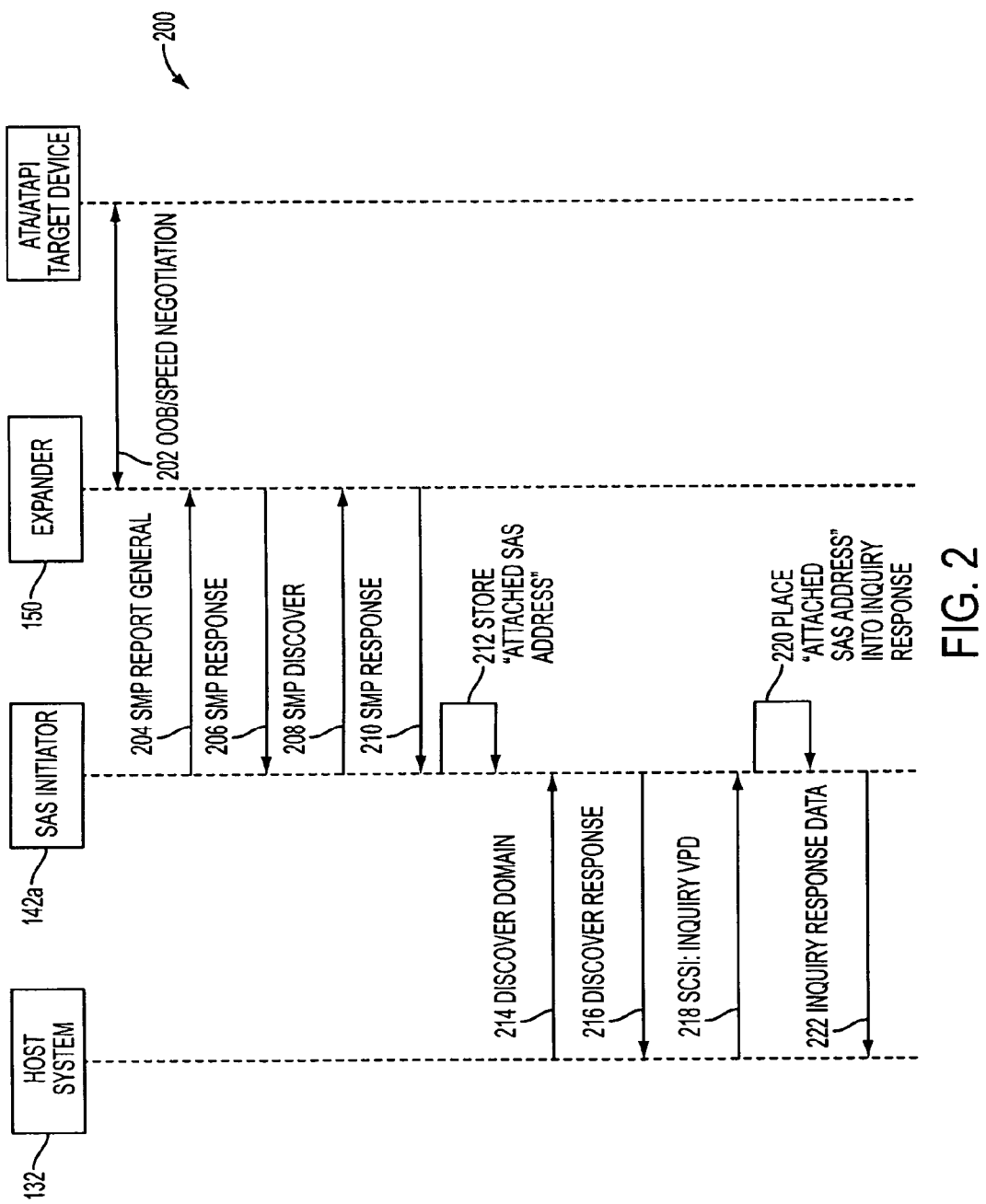
FIG. 2 is a diagram illustrating exemplary operations according to one embodiment.

FIG. 2 depicts a diagram 200 illustrating operations which may be performed by an embodiment. In FIG. 2, certain portions of the system 100 depicted in FIG. 1 have been omitted for clarity (for example, circuit card 120), but it is to be understood that like parts of FIG. 2 can be implemented in a manner consistent with an embodiment depicted in FIG. 1, or alternatively in other system implementations, without departing from this embodiment. The following description of the diagram 200 of FIG. 2 shall make specific reference to operations for providing an attached SAS address to one or more target ATA/ATAPI devices comprised in mass storage 106 coupled to expander 150 using for example, SAS initiator engine 142a. However, it should be understood that the following description can apply to any ATA/ATAPI device whether or not comprised in mass storage 106 and any SAS initiator engine.

In this embodiment, expander device 150 may be capable of exchanging commands and data with one or more ATA/ATAPI target devices coupled thereto. Operations may include an initiating procedure 202 that may include an out-of-band (OOB) signal sequence and/or speed negotiation signal exchange with an ATA/ATAPI target. Operations 202 may be capable of determining the presence, type and capabilities of one or more SATA devices which may be coupled to expander 150. The expander 150 may also be capable of assigning an attached SAS address to an ATA/ATAPI target device attached thereto. Also, in this embodiment, SAS initiator 142a may be capable of exchanging SMP commands with expander 150 to discover, for example, the presence, type and capabilities of one or more ATA/ATAPI devices which may be coupled to expander 150, which may include discovering an attached SAS address for one or more target ATA/ATAPI devices, and/or domain information and/or other information related to expander 150. In this embodiment, for example, operations may include generating an SMP Report General command 204 to expander 150. In response thereto, operations may include generating an SMP response 206. This SMP exchange may provide domain information of one or more SAS domains (which may comprise one or more ATA/ATAPI devices) coupled to expander 150 and/or other expander information to SAS initiator 142a. Operations may further include generating, by the SAS initiator 142a, an SMP DISCOVER command 208. In response thereto, operations may also include generating, by the expander 150, an SMP response 210, which may comprise ATA/ATAPI device type and capabilities of the ATA/ATAPI target device coupled to expander 150. SMP response 210 may also include the attached SAS address for one or more target ATA/ATAPI devices. Operations may further include discovering, by the SAS initiator engine 142a, a unique attached SAS address for the ATA/ATAPI target device, and storing the attached SAS address in memory 212.

Operations of this embodiment may also include SCSI command exchanges between SAS initiator 142a and host system 132. For example, operations may include generating, by the host system 132, a SCSI Discover Domain command 214. In response thereto, operations may also include, generating, by the SAS initiator 142a, a SCSI Discover Response 216, which may include domain information of one or more SAS domains coupled to expander 150. Operations may further include generating, by the host system 132, a SCSI Inquiry VPD Page 0x83 command 218. In response thereto, operations may further include discovering an attached SAS address for one or more ATA/ATAPI target devices (as may be generated by expander 150), and generating a SCSI response, by SAS initiator engine 142a, that includes an attached SAS address for one or more ATA/ATAPI target devices (coupled to expander 150) into a SCSI inquiry response 220. The SCSI response may be forwarded 222 to host system 132. As with the previous embodiment, the attached SAS address may comprise a unique identification that complies or is compatible with an IEEE ID.

Figure 3:
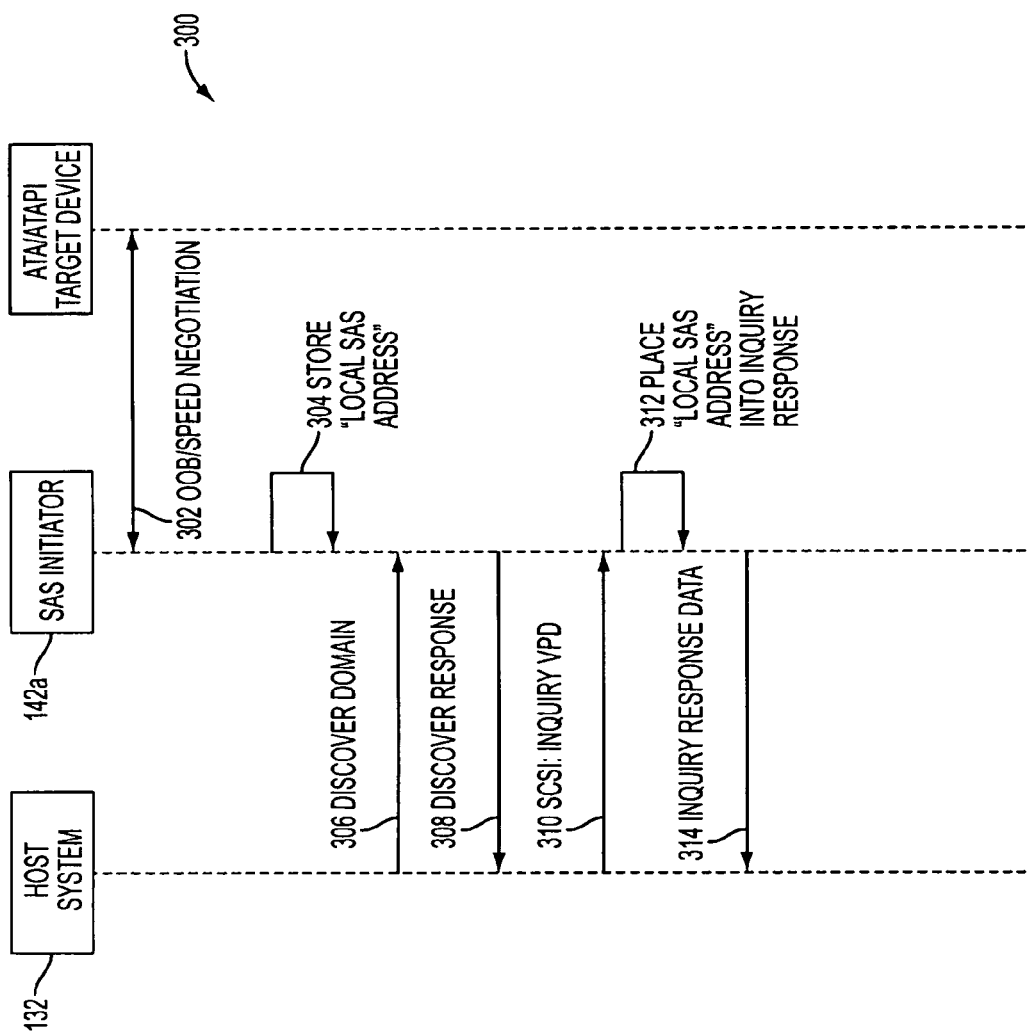
FIG. 3 is a diagram illustrating exemplary operations according to one embodiment.

FIG. 3 depicts a diagram 300 illustrating operations which may be performed by an embodiment. In FIG. 3, certain portions of the system 100 depicted in FIG. 1 have been omitted for clarity (for example, circuit card 120), but it is to be understood that like parts of FIG. 3 can be implemented in a manner consistent with an embodiment depicted in FIG. 1, or alternatively in other system implementations, without departing from this embodiment. The following description of the diagram 300 of FIG. 3 shall make specific reference to operations for providing and discovering a local SAS address to one or more target direct attached ATA/ATAPI devices 108 using for example, SAS initiator engine 142a. However, it should be understood that the following description can apply to any ATA/ATAPI device and any SAS initiator engine.

In this embodiment, SAS initiator 142a may be capable of exchanging commands and data with one or more direct attached SATA target devices coupled thereto. Operations may include an initiating procedure 302 that may include an out-of-band (OOB) signal sequence and/or speed negotiation signal exchange with an ATA/ATAPI target device. Operations 302 may be capable of determining the presence, type and capabilities of one or more SATA devices which may be coupled to SAS initiator 142a. Operations may further include generating, by the SAS initiator engine 142a, a unique local SAS address for the ATA/ATAPI target device, and storing the local SAS address in memory 304. Operations of this embodiment may also include SCSI command exchanges between SAS initiator 142a and host system 132. For example, operations may include generating, by the host system 132, a SCSI Discover Domain command 306. In response thereto, operations may also include, generating, by the SAS initiator 142a, a SCSI Discover Response 308, which may include domain information of one or more SAS domains coupled to SAS initiator 142a. Operations may further include generating, by the host system 132, a SCSI Inquiry VPD Page 0x83 command 310. In response thereto, operations may further include discovering a local SAS address for one or more ATA/ATAPI target devices, and generating a SCSI response, by SAS initiator engine 142a, that includes the local SAS address for one or more ATA/ATAPI target devices into a SCSI inquiry response 312. The SCSI response may be forwarded 314 to host system 132. As with the previous embodiment, the attached SAS address may comprise a unique identification that complies or is compatible with an IEEE ID.

Figure 4:
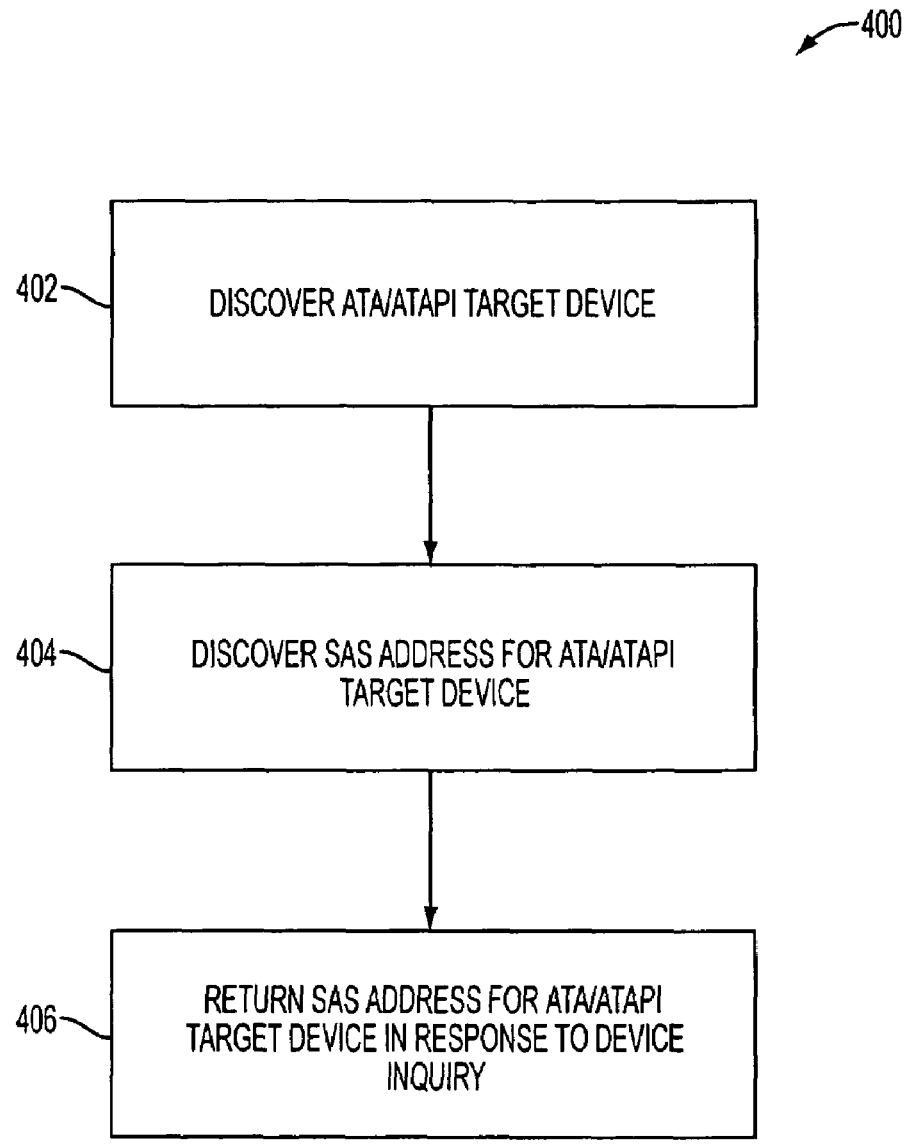
FIG. 4 is a diagram illustrating exemplary operations according to one embodiment.

FIG. 4 depicts a diagram 400 illustrating operations which may be performed by an embodiment. Operations may include discovering at least one ATA/ATAPI target device 402. Operations may further include discovering a SAS address for the ATA/ATAPI target device 404. As described in previous embodiments, for ATA/ATAPI devices coupled to an expander, an initiator engine may be capable of discovering an attached SAS address generated by the expander. For ATA/ATAPI devices directly coupled to a circuit card, an initiator engine may be capable of discovering a local SAS address generated by an initiator engine. Operations may also include returning the SAS address for the ATA/ATAPI target device in response to a device inquiry command 406.

Thus, in summary, one embodiment disclosed herein may provide an integrated circuit (integrated circuit) that may be capable, at least in part, of discovering at least one ATA/ATAPI target device. The integrated circuit may also be capable, at least in part, of discovering a SAS address for the at least one ATA/ATAPI target device. The integrated circuit may also be capable of returning the SAS address for at least one ATA/ATAPI target device in response to a device inquiry command.

While not shown in the drawings, the expander device 150 of any of the embodiment provided herein may also comprise one or more upstream physical interfaces (PHYs) which may be capable of electrically coupling expander device 150 with initiator engine 142a and/or 142b. A "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. Each PHY may have a unique identifier. "Upstream PHY", as used in any embodiment herein, may be defined as a physical and/or virtual interface between the expander 150 and the circuit card 120. The expander device 150 may also comprise one or more ports (not shown). A port may contain one or more PHYs. For example, a narrow port may contain only one PHY, while a wide port may contain more than one PHY. In this embodiment, each upstream PHY may communicate with SAS initiator engine 142a and/or 142b individually via respective communications links 158 and/or 160.

The expander device 150 may also include one or more downstream PHYs which may be capable of electrically coupling expander device 150 with one or more respective SAS devices, for example 104a, 104b, 104c, and/or 104d comprised in mass storage 104 and/or one or more SATA devices, for example 106a, 106b, 106c, and/or 106d comprised in mass storage 106. Each downstream PHY may communicate with individual SAS and/or ATA/ATAPI devices via respective communication links 162 and/or 164. Integrated circuit 140 may be capable of controlling one or more PHYs comprised in expander 150. For example, integrated circuit 140 may be capable of enabling or disabling one or more upstream PHYs and/or downstream PHYs. Also, integrated circuit 140 may be capable of designating one or more PHYs as SAS communication protocol target PHYs and one or more PHYs as SATA communication protocol target PHYs. In any embodiment provided herein, the attached SAS address, as may be generated by expander 150, may include address information of a selected PHY (upstream and/or downstream) to which a ATA/ATAPI device is coupled to the expander 150.

Also, although not shown in the drawings, circuit card 120 may also comprise one or more PHYs which may be capable of electrically coupling circuit card with expander device 150 and/or one or more direct attached devices 108. In any embodiment provided herein, the local SAS address, as may be generated by SAS initiator 142a and/or 142b, may include address information of a selected PHY (upstream and/or downstream) to which a direct attached ATA/ATAPI device is coupled to the circuit card 120.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an integrated circuit configured to discover at least one of an Advanced Technology Attachment (ATA) or an Advanced Technology Attachment with Packet Interface (ATAPI) target device, said target device not including a unique Institute for Electronic and Electrical Engineers (IEEE) device name, said integrated circuit is also configured to assign a Serial Attached Small Computer System Interface (SAS) address for said at least one ATA/ATAPI target device, said integrated circuit is also configured to return said SAS address for said at least one ATA/ATAPI target device in response to a device inquiry command, said device inquiry command comprising a Small Computer System Interface (SCSI) Vital Product Data (VPD) Page 0x83 command, and said response comprising a SCSI response that includes said SAS address for said target device.

2. The apparatus of claim 1, wherein:
said integrated circuit is also configured to translate between first commands and second commands.

3. The apparatus of claim 2, wherein:
said first commands comprising Small Computer System Interface (SCSI) commands and said second commands comprising Advanced Technology Attachment With Packet Interface (ATA/ATAPI) commands.

4. The apparatus of claim 1, wherein:
said SAS address complies with an Institute for Electronic and Electrical Engineers (IEEE) unique device identity.

5. The apparatus of claim 1, wherein:
said SAS address comprises an attached SAS address assigned for target ATA/ATAPI devices in communication with said integrated circuit through an expander device.

6. The apparatus of claim 1, wherein:
said SAS address comprises a local SAS address for ATA/ATAPI target devices in direct communication with said integrated circuit.

7. A system, comprising:
at least one circuit card configured to communicate in accordance with a plurality of different communication protocols, said at least one circuit card being configured to be-coupled to a bus, said circuit card comprising an integrated circuit configured to discover at least one an Advanced Technology Attachment (ATA) or an Advanced Technology Attachment with Packet Interface (ATAPI) target device, said target device not including a unique Institute for Electronic and Electrical Engineers (IEEE) device name, said integrated circuit is also configured to assign a Serial Attached Small Computer System Interface (SAS) address for said at least one ATA/ATAPI target device, said integrated circuit is also configured to return said SAS address for said at least one ATA/ATAPI target device in response to a device inquiry command, said device inquiry command comprising a Small Computer System Interface (SCSI) Vital Product Data (VPD) Page 0x83 command, and said response comprising a SCSI response that includes said SAS address for said target device.

8. The system of claim 7, wherein:
said integrated circuit is also configured to translate between first commands and second commands.

9. The system of claim 8, wherein:
said first commands comprising Small Computer System Interface (SCSI) commands and said second commands comprising Advanced Technology Attachment With Packet Interface (ATA/ATAPI) commands.

10. The system of claim 7, wherein:
said SAS address complies with an Institute for Electronic and Electrical Engineers (IEEE) unique device identity.

11. The system of claim 7, wherein:
said SAS address comprises an attached SAS address for target ATA/ATAPI devices in communication with said integrated circuit through an expander device.

12. The system of claim 7, wherein:
said SAS address comprises a local SAS address for ATA/ATAPI target devices in direct communication with said integrated circuit.

13. An article comprising:
a storage medium having stored thereon instructions that when executed by a machine result in the following operations:
discovering at least one of an Advanced Technology Attachment (ATA) or an Advanced Technology Attachment with Packet Interface (ATAPI) target device, said target device not including a unique Institute for Electronic and Electrical Engineers (IEEE) device name;
assigning a Serial Attached Small Computer System Interface (SAS) address for said target device; and
returning said SAS address for said target device in response to a device inquiry command;
said device inquiry command comprising a Small Computer System Interface (SCSI) Vital Product Data (VPD) Page 0x83 command, and said response comprising a SCSI response that includes said SAS address for said target device.

14. The article of claim 13, wherein said instructions that when executed by said machine result in the following additional operations:
translating between first commands and second commands.

15. The article of claim 14, wherein:
said first commands comprising Small Computer System Interface (SCSI) commands and said second commands comprising Advanced Technology Attachment With Packet Interface (ATA/ATAPI) commands.

16. The article of claim 13, wherein:
said SAS address complies with an Institute for Electronic and Electrical Engineers (IEEE) unique device identity.

17. The article of claim 13, wherein:
said SAS address comprises an attached SAS address for target ATA/ATAPI devices in communication with said integrated circuit through an expander device.

18. The article of claim 13, wherein:
said SAS address comprises a local SAS address for ATA/ATAPI target devices in direct communication with said integrated circuit.

19. A method, comprising:
discovering at least one of an Advanced Technology Attachment (ATA) or an Advanced Technology Attachment with Packet Interface (ATAPI) target device, said target device not including a unique Institute for Electronic and Electrical Engineers (IEEE) device name;
assigning a Serial Attached Small Computer System Interface (SAS) address for said target device; and
returning said SAS address for said at least one ATA/ATAPI target device in response to a device inquiry command;
said device inquiry command comprising a Small Computer System Interface (SCSI) Vital Product Data (VPD) Page 0x83 command, and said response comprising a SCSI response that includes said SAS address for said target device.

20. The method of claim 19, further comprising:
translating between first commands and second commands.

21. The method of claim 20, wherein:
said first commands comprising Small Computer System Interface (SCSI) commands and said second commands comprising Advanced Technology Attachment With Packet Interface (ATA/ATAPI) commands.

22. The method of claim 19, wherein:
said SAS address complies with an Institute for Electronic and Electrical Engineers (IEEE) unique device identity.

23. The method of claim 19, wherein:
said SAS address comprises an attached SAS address for target ATA/ATAPI devices in communication with said integrated circuit through an expander device.

24. The method of claim 19, wherein:
said SAS address comprises a local SAS address for ATA/ATAPI target devices in direct communication with said integrated circuit.

* * * * *